US010518334B2

(12) United States Patent
Miura et al.

(10) Patent No.: US 10,518,334 B2
(45) Date of Patent: Dec. 31, 2019

(54) CHUCK DEVICE

(71) Applicant: FUJI CORPORATION, Chiryu-shi (JP)

(72) Inventors: Takuya Miura, Toyota (JP); Toshitaka Kimura, Nisshin (JP); Takenobu Imamichi, Nagoya (JP); Masato Ando, Toyota (JP)

(73) Assignee: FUJI CORPORATION, Chiryu-shi (JP)

( * ) Notice: Subject to any disclaimer, the term of this patent is extended or adjusted under 35 U.S.C. 154(b) by 0 days.

(21) Appl. No.: 15/750,411

(22) PCT Filed: Aug. 6, 2015

(86) PCT No.: PCT/JP2015/072339
§ 371 (c)(1),
(2) Date: Feb. 5, 2018

(87) PCT Pub. No.: WO2017/022118
PCT Pub. Date: Feb. 9, 2017

(65) Prior Publication Data
US 2018/0229310 A1   Aug. 16, 2018

(51) Int. Cl.
*B23B 31/113* (2006.01)
*B23B 31/40* (2006.01)
*B23B 31/02* (2006.01)

(52) U.S. Cl.
CPC ............ *B23B 31/113* (2013.01); *B23B 31/02* (2013.01); *B23B 31/4033* (2013.01);
(Continued)

(58) Field of Classification Search
CPC ........... B23B 31/113; Y10T 279/17863; Y10T 279/17888
See application file for complete search history.

(56) References Cited

U.S. PATENT DOCUMENTS 2,526,998 A * 10/1950 Davis .................... B23B 31/113
279/93
2,801,860 A *  8/1957 Getts .................... B23B 31/113
279/23.1
(Continued)

FOREIGN PATENT DOCUMENTS

| CH | 347406 A  * | 6/1960 | ............. B23B 31/06 |
| FR | 1265892 A * | 7/1961 | ........... B23B 31/113 |
| JP | 5-70810 U   | 9/1993 | |

OTHER PUBLICATIONS

International Search Report dated Oct. 20, 2015, in PCT/JP2015/072339, filed Aug. 6, 2015.

*Primary Examiner* — Eric A. Gates
(74) *Attorney, Agent, or Firm* — Oblon, McClelland, Maier & Neustadt, L.L.P.

(57) ABSTRACT

A chuck device includes a chuck main body, an exchange member, an axial direction regulating mechanism, and a circumferential direction regulating mechanism. The axial direction regulating mechanism has a circumferential groove section, which extends in the circumferential direction, that is recessed into one of the chuck main body and the exchange member and a radially protruding section, which is able to protrude in the radial direction, that is disposed in the other of the chuck main body and the exchange member. The circumferential direction regulating mechanism has an axially recessed section, which is recessed in the axial direction, that is disposed in one of the chuck main body and the exchange member and an axially protruding section, which is able to protrude in the axial direction, that is disposed in the other of the chuck main body and the exchange member.

8 Claims, 8 Drawing Sheets

(52) U.S. Cl.
CPC ..... *B23B 2231/04* (2013.01); *Y10T 279/1008* (2015.01); *Y10T 279/17888* (2015.01); *Y10T 279/32* (2015.01); *Y10T 279/3406* (2015.01); *Y10T 409/309464* (2015.01)

(56) References Cited

U.S. PATENT DOCUMENTS

| | | | | |
|---|---|---|---|---|
| 3,512,793 A | * | 5/1970 | Botimer | B23B 31/113 |
| | | | | 279/91 |
| 3,521,896 A | * | 7/1970 | Matsumoto | B23B 31/006 |
| | | | | 279/102 |
| 3,663,028 A | * | 5/1972 | King, Jr. | B23B 31/113 |
| | | | | 279/904 |
| 5,018,266 A | * | 5/1991 | Hutchinson | B23B 31/113 |
| | | | | 483/1 |
| 5,061,129 A | * | 10/1991 | Baudermann | B23B 31/113 |
| | | | | 409/234 |
| 5,667,228 A | * | 9/1997 | Fabris | B23B 31/113 |
| | | | | 279/143 |

* cited by examiner

CHUCK DEVICE

TECHNICAL FIELD

The present invention relates to a chuck device that, is used in a lathe and the like when a workplace is gripped.

BACKGROUND ART

PTL 1 discloses a chuck device that is provided with an exchangeable fitting body (chuck portion) according to the type of workpiece. The fitting body is disposed to be attachable to and detachable from a chuck base. When the fitting body is detached from the chuck base, a first cylinder device and a second cylinder device are used to separate the fitting body from the chuck base. When the fitting body is attached to the chuck base, a disc spring is used to cause the fitting body to approach the chuck base. Note that, biasing force (elastic restoring force) of the disc spring is accumulated in the disc spring by driving the first cylinder device when the fitting body is detached from the chuck base.

CITATION LIST

Patent Literature

PTL: JP-U-5-70810

SUMMARY OF INVENTION

Technical Problem

However, in a case of the chuck device in PTL 1, a first cylinder device, a second cylinder device, and a power source of the cylinder devices are necessary to exchange the fitting body. Therefore, the structure becomes complicated. Therefore, the present invention has the object of providing a chuck device that is able to simply exchange an exchange member using a simple structure.

Solution to Problem

In order to solve the problem, the present invention provides a chuck device that is provided with: a chuck main body; an exchange member that is disposed to be exchangeable in the chuck main body; an axial direction regulating mechanism that has a circumferential groove section which is recessed into one of the chuck main body and the exchange member and extends in the circumferential direction, and a radially protruding section which is disposed in the other of the chuck main body and the exchange member and is able to protrude in the radial direction, and regulates rattling of the exchange member in the axial direction with respect to the chuck main body by causing the exchange member to abut with the chuck main body from the axial direction and inserting the radially protruding section into the circumferential groove section; and a circumferential direction regulating mechanism that has an axially recessed section which is disposed in one of the chuck main body and the exchange member, and is recessed in the axial direction, and an axially protruding section, which is disposed in the other of the chuck main body and the exchange member and is able to protrude in the axial direction, and regulates rattling of the exchange member in the circumferential direction with respect to the chuck main body by causing the exchange member to rotate by a predetermined angle in the circumferential direction and causing the radially protruding section to slide in the circumferential groove section and inserting the axially protruding section into the axially recessed section in a state in which rattling of the exchange member in the axial direction with respect to the chuck main body is regulated by the axial direction regulating mechanism.

When the exchange member is attached to the chuck main body, first, the radially protruding section is inserted into the circumferential groove section by causing the exchange member to abut with the chuck main body from the axial direction. By the insertion, rattling of the exchange member in the axial direction is regulated with respect to the chuck main body. Subsequently, the exchange member is caused to rotate by a predetermined angle in the circumferential direction. That is, the radially protruding section is caused to slide in the circumferential groove section. Then, the axially protruding section is inserted into the axially recessed section. By the insertion, rattling of the exchange member in the circumferential direction is regulated with respect to the chuck main body.

Advantageous Effects of Invention

According to the present invention, the structure of a chuck device is simplified. In addition, it is possible to simply exchange the exchange member with respect to the chuck main body.

DESCRIPTION OF EMBODIMENTS

Embodiments of a chuck device of the present invention will be described below.

Configuration of Chuck Device

Figure 1:
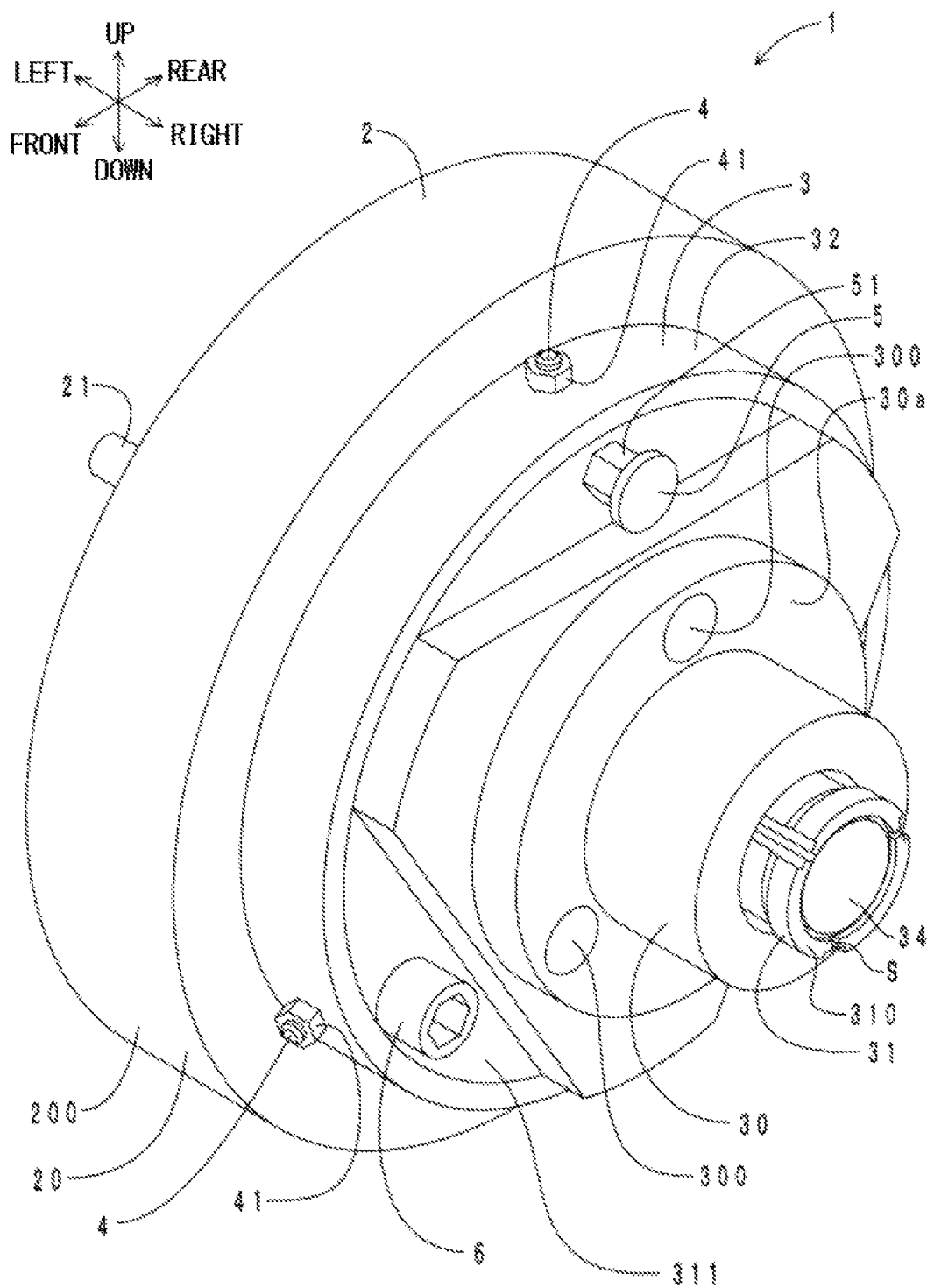
FIG. 1 is a perspective view of a chuck device that is one embodiment of a chuck device of the present invention.
Figure 2:
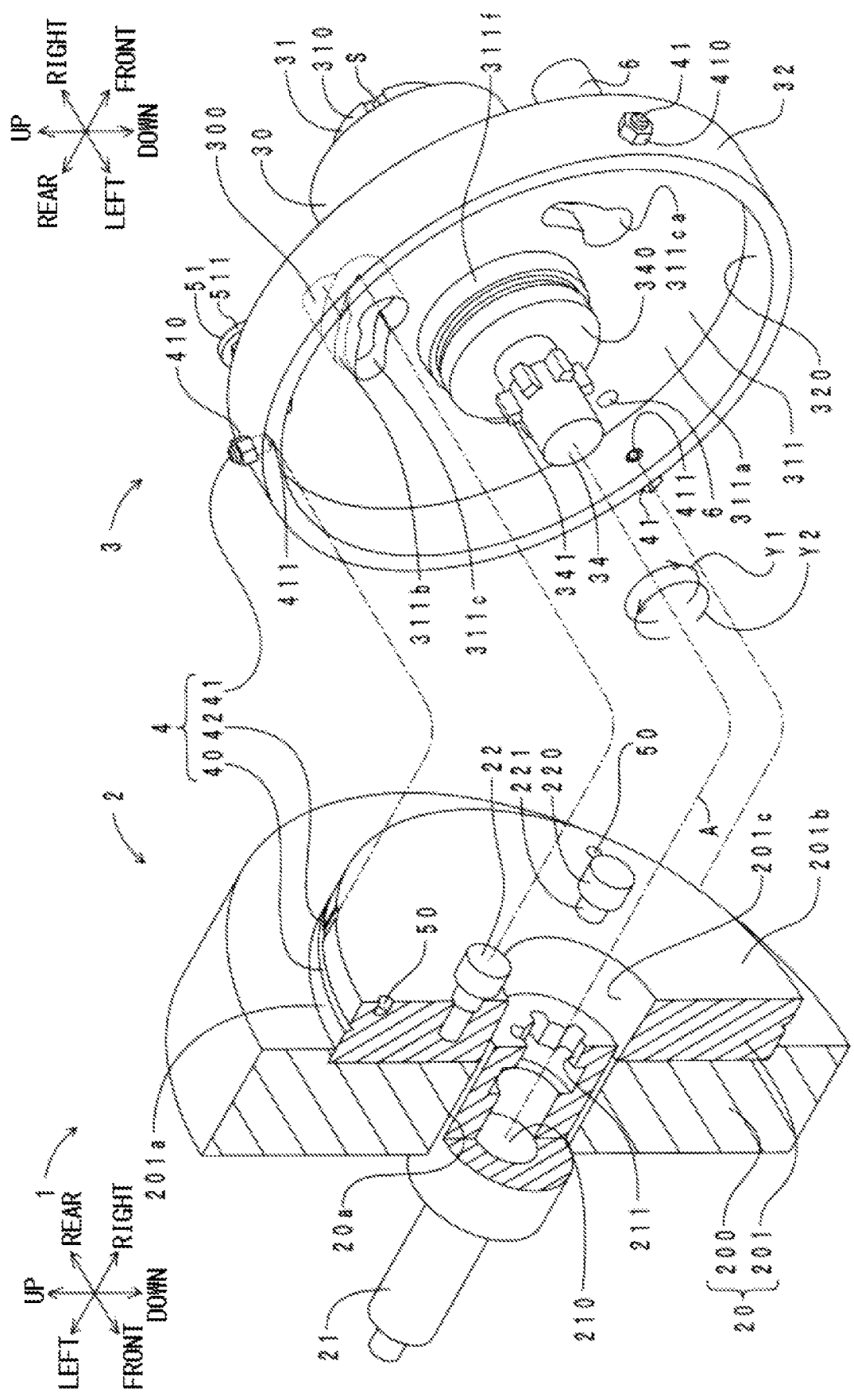
FIG. 2 is an exploded perspective view of the chuck device.
Figure 3:
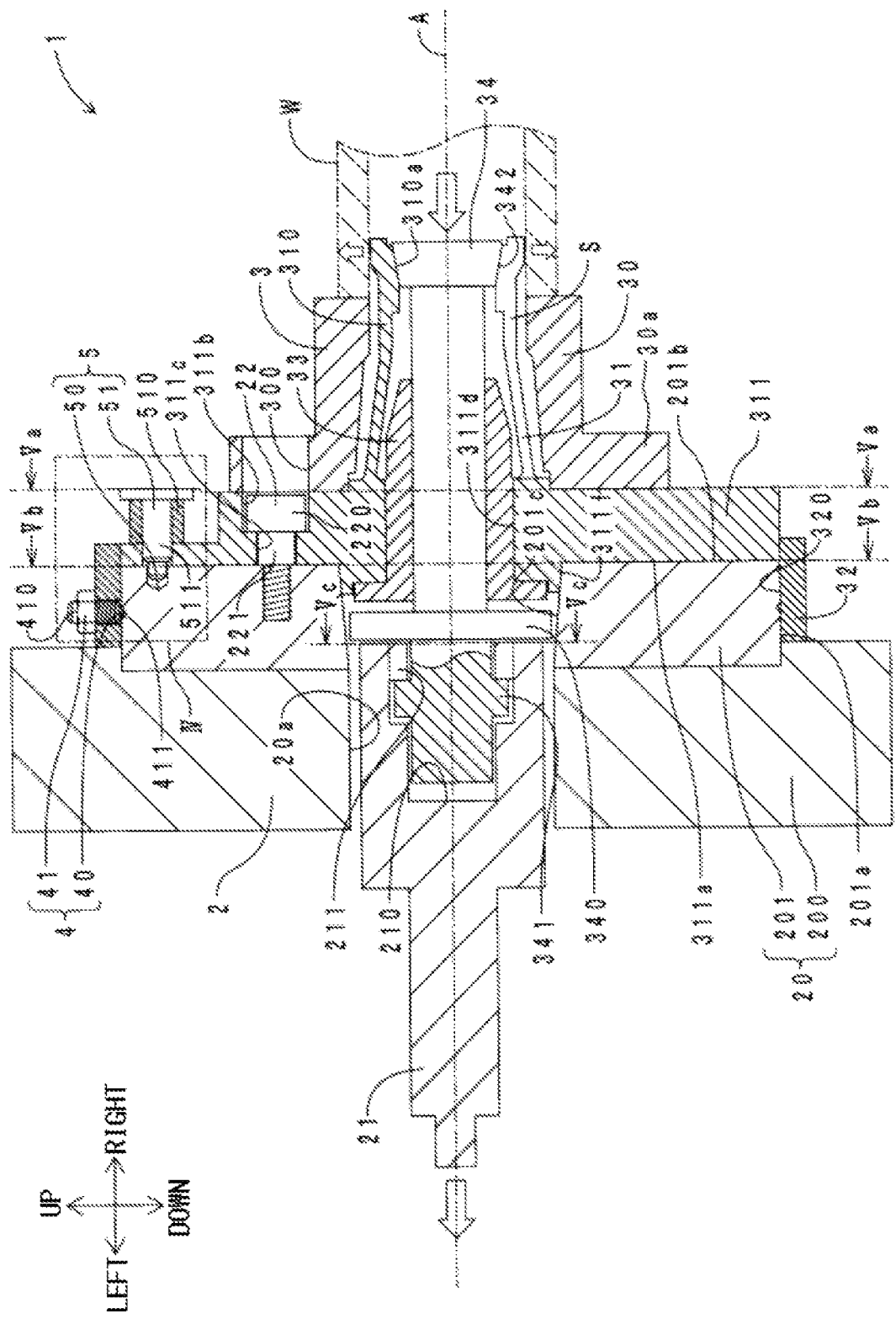
FIG. 3 is an axial direction sectional view of the chuck device.
Figure 4:
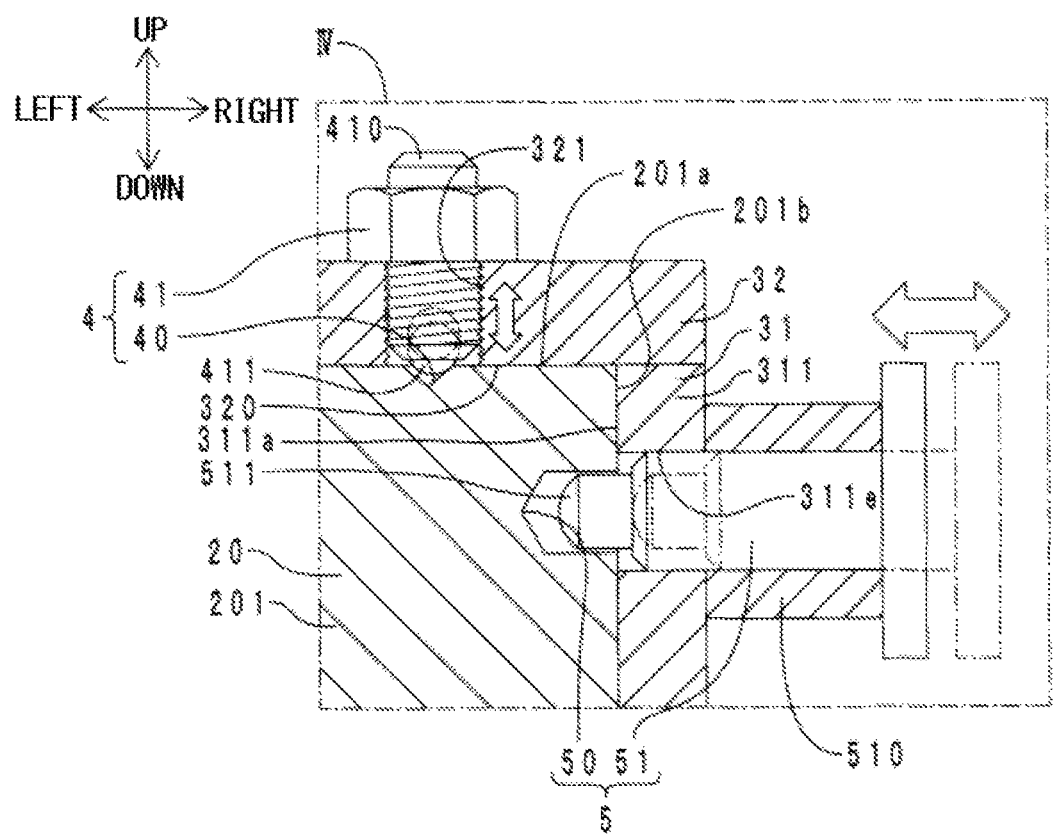
FIG. 4 is an enlarged view of frame IV of FIG. 3.

First, a configuration of the chuck device in the present embodiment will be described. FIG. 1 illustrates a perspective view of the chuck device in the present embodiment. FIG. 2 illustrates an exploded perspective view of the chuck device. FIG. 3 illustrates an axial direction sectional view of the chuck device. FIG. 4 illustrates an enlarged view of frame IV of FIG. 3. FIG. 5(a) illustrates a sectional view along a Va-Va direction of FIG. 3. FIG. 5(b) illustrates a sectional view along a Vb-Vb direction of FIG. 3. FIG. 5(c) illustrates a sectional view along a Vc-Vc direction of FIG.

3. FIG. 6 illustrates an enlarged view of frame VI of FIG. 5(b). Note that, in FIG. 5(b), a circumferential wall member 32 is omitted.

In this arrangement, an angle of a workpiece holding member 3 with respect to the chuck main body 2 illustrated in FIGS. 1-3, 5(a)-5(c), and 6 is a lock angle C. In addition, the angle of a workpiece holding member 3 with respect to the chuck main body 2 illustrated in FIG. 4 is a release angle B. The workpiece holding member 3 is attached to the chuck main body 2, and the configuration of the chuck device 1 of a case where the workpiece holding member 3 is at a lock angle C will be described below.

As shown in FIGS. 1-6, the chuck device 1 of the present embodiment is a so-called inner diameter collet chuck device. The chuck device 1 is provided with a chuck main body 2, a workpiece holding member 3, an axial direction regulating mechanism 4, a circumferential direction regulating mechanism 5, and two bolts 6. The workpiece holding member 3 is included in the concept of the "exchange member" of the present invention.

Chuck Main Body 2

The chuck main body 2 is attached to the right end (tip end) of the main spindle of a lathe (omitted from the diagrams). As shown in FIG. 3, the chuck main body 2 is able to rotate about an axis A of the main spindle that extends in the left-right direction. The chuck main body 2 is provided with a base 20, a draw bar 21, and three bolts 22.

The base 20 has a stepped disc shape. The base 20 is provided with a through hole 20a, a first member 200, and a second member 201. The through hole 20a passes through the center in the radial direction of the base 20 in the left-right direction. The second member 201 is disposed on the right face of the first member 200 (surface on the workpiece holding member side 3). The second member 201 has a smaller diameter than the first member 200. A tapered surface 201c pointed from the right side toward the left side is disposed on the inner circumferential surface of the second member 201 out of the through hole 20a.

The draw bar 21 has a round rod shape extending in the left-right direction. The draw bar 21 is inserted in the through hole 20a. The draw bar 21 is movable in the left-right direction with respect to the base 20. The draw bar 21 is provided with a recessed section 210 and multiple tooth sections 211. The recessed section 210 is disposed on the right end of the draw bar 21. The recessed section 210 has a bottomed cylindrical shape that is open to the right side. The multiple tooth sections 211 are disposed on the inner circumferential surface on the opening edge of the recessed section 210. The multiple tooth sections 211 are lined up in the circumferential direction.

Each of the three bolts 22 is screwed in a fastened state on a right face 201b of the second member 201. The right face 201b is included in the concept of the "axial end face" of the present invention. As shown in FIG. 5(b), the three bolts 22 are disposed separated from each other by the center angle of 120° (in detail, when the chuck device 1 is viewed from the axial direction (right side or left side), the center angle is centered on the axis A, hereinafter the same applies). As shown in FIG. 3, the bolt 22 is provided with a body section 221 and a head section 220. The head section 220 has a larger diameter than the body section 221.

Workpiece Holding Member 3

The workpiece holding member 3 is attached to the right end (tip end) of the chuck main body 2. The workpiece holding member 3 is exchangeable with respect to the chuck main body 2 according to the type of workpiece W that is indicated in FIG. 3. The workpiece holding member 3 is provided with a strip 30, a collet member 31, the circumferential wall member 32, a guide member 33, and a shaft 34.

The collet member 31 is provided with a collet section 310 and a bottom wall section 311. The bottom wall section 311 has a disc shape. A left face (surface on the chuck main body 2 side) 311a of the bottom wall section 311 abuts with a right face 201b of the second member 201. The left face 311a is included in the concept of the "bottom face" of the present invention. As shown in FIGS. 2-4, the bottom wall section 311 is provided with three head section long holes 311b, three body section long holes 311c, a first through hole 311d, three second through-holes 311e, and a boss section 311f.

As shown in FIG. 3, the boss section 311f protrudes to the left side from the radial direction center of the bottom wall section 311. The outer circumferential surface of the boss section 311f is a tapered surface pointed from the right side toward the left side. The first through hole 311d passes through the center in the radial direction of the bottom wall section 311 in the left-right direction. As shown in FIG. 4, the three second through holes 311e are disposed separated from each other by a center angle of 120°. The second through hole 311e passes through the bottom wall section 311 in the left-right direction.

As shown in FIGS. 2 and 5(a), the body section long hole 311c is recessed in the left face 311a. The body section long hole 311c has a partial arc shape. The body section long hole 311c extends in the circumferential direction across a center angle of 30° between the release angle B and the lock angle C. The center angle 30° is included in the concept of the "predetermined angle" of the present invention. The radial width of the body section long hole 311c is set such that the body section 221 of the bolt 22 is able to pass through and the head section 220 is not able to pass through. In this arrangement, the direction from the release angle B toward the lock angle C is defined as a lock direction Y1 and the direction opposite thereto is defined as a release direction Y2. A head section insertion section 311ca, through which the head section 220 is able to pass, is formed on the lock direction end portion of the body section long hole 311c. The head section long hole 311b is recessed in the right face of the bottom wall section 311. The head section long hole 311b is linked to the right side of the body section long hole 311c. The head section long hole 311b has a partial arc shape. The head section long hole 311b extends in the circumferential direction across a center angle of 30° between the release angle B and the lock angle C in the same manner as the body section long hole 311c. The radial width of the head section long hole 311b is set such that the head section 220 of the bolt 22 is able to pass through.

As shown in FIG. 3, the collet section 310 has a cylindrical shape extending in the left-right direction. The collet section 310 protrudes from the opening edge of the first through hole 311d on the right face of the bottom wall section 311 to the right side. A tapered surface 310a pointed from the right side toward the left side is disposed on the inner circumferential surface of the right end of the collet section 310. As shown in FIG. 1, three slits S are formed on the collet section 310 to be separated from each other by a center angle of 120°. The slit S extends in the left-right direction. Therefore, the collet section 310 is able to be radially enlarged and deformed.

As shown in FIG. 3, the circumferential wall member 32 has a cylindrical shape. The right end of the circumferential wall member 32 is mounted on the bottom wall section 311. The inner circumferential surface 320 of the circumferential wall member 32 abuts with the outer circumferential surface 201a of the second member 201. As shown in FIG. 4, the circumferential wall member 32 is provided with three plunger fixing holes 321. The three plunger fixing holes 321 are disposed separated from each other by a center angle of 120°. The circumferential wall member 32 is passed through the plunger fixing holes 321 in the radial direction.

As shown in FIG. 3, the strip 30 has a cylindrical shape extending in the left-right direction. A workpiece W abuts with the right end face of the strip 30. The flange section 30a is formed on the left end of the strip 30, Three bolt confirmation holes 300 are drilled in the flange section 30a. The three bolt confirmation holes 300 are disposed separated from each other by a center angle of 120°. As shown in FIG. 2, the bolt confirmation hole 300 is linked to the right side of the release direction end portion of the head section long hole 311b.

As shown in FIG. 2, three hole sets (hole sets made from the body section long hole 311c, the head section long hole 311b, and the bolt confirmation hole 300 that are linked to each other) are disposed separated from each other by a center-angle of 120°. As shown in FIG. 5(a), the bolt 22 is disposed on the release direction end portion of the hole set. As shown in FIG. 3, the head section 220 of the bolt 22 and a step section between the body section long hole 311c and the head section long hole 311b engage in the left-right direction.

As shown in FIG. 3, a guide member 33 has a cylindrical shape. The guide member 33 is disposed on the radially inner side of the first through hole 311d of the bottom wall section 311. The shaft 34 has a round rod shape extending in the left-right direction. The shaft 34 is inserted into the radially inner side of the guide member 33 and the radial inner side of the collet section 310. The shaft 34 is movable in the left-right direction with respect to the guide member 33 and the collet section 310. The shaft 34 is provided with a flange section 340 and multiple tooth sections 341. The flange section 340 is disposed between the recessed section 210 of the draw bar 21 and the guide member 33. The multiple tooth sections 341 are disposed on the left side of the flange section 340. The multiple tooth sections 341 are accommodated in the recessed section 210. The multiple tooth sections 341 are lined up in the circumferential direction. As shown in FIGS. 3 and 5(c), the multiple tooth sections 211 of the draw bar 21 and the multiple tooth sections 341 of the shaft 34 engage from the left-right direction. As shown in FIG. 3, a tapered surface 342 pointed from the right side toward the left side is disposed on the outer circumferential surface of the right end of the shaft 34. The tapered surface 310a of the collet section 310 and the tapered surface 342 of the shaft 34 abut with each other.

When the workpiece W is gripped by the chuck device 1, the draw bar 21 is pulled to the left side. Tensile force from the draw bar 21 is transferred to the shaft 34 through an engaging section of the tooth section 211 and the tooth section 341, Therefore, the tapered surface 342 moves to the left side with respect to the tapered surface 310a. Accordingly, the collet section 310 is radially enlarged and deformed. Due to the radial enlargement and deformation, the collet section 310, that is, the chuck device 1 grips the workpiece W from the radially inner side.

Axial Direction Regulating Mechanism 4

An axial direction regulating mechanism 4 is provided with a circumferential groove section 40, three ball plungers 41, and three axial groove sections 42. The ball plunger 41 is included in the concept of the "plunger" of the present invention.

As shown in FIGS. 2 and 3, the circumferential groove section 40 is recessed in the outer circumferential surface 201a of the second member 201. The circumferential groove section 40 has an endless ring shape that extends in the circumferential direction. As shown in FIG. 4, the circumferential groove section 40 has a sectional V shape.

As shown in FIGS. 2, 5(b), and 6, three axial groove sections 42 are each recessed in the outer circumferential surface 201a of the second member 201. Three axial groove sections 42 are disposed separated from each other by a center-angle of 120°. The axial groove section 42 has a straight line shape that extends in the axial direction. The groove bottom face of the axial groove section 42 has a plane shape. The axial groove section 42 links the circumferential groove section 40 and the right face 201b of the second member 201.

As shown in FIGS. 4 and 5(a), three ball plungers 41 are respectively disposed in the plunger fixing hole 321 of the circumferential wall member 32. The three ball plungers 41 are disposed separated from each other by a center angle of 120°. The ball plunger 41 is provided with a base section 410 and a ball 411. The ball 411 is included in the concept of the "protruding section" of the present invention. The base section 410 has a screw shape that extends in the radial direction (radial direction of the circumferential wall member 32). The base section 410 is screwed in the plunger fixing hole 321. The ball 411 is disposed to be accessible on the radially inner end of the base section 410 (radial inner end of the circumferential wall member 32). The ball 411 is biased to the radially inner side (direction that protrudes from the base section 410) by a spring (omitted from the drawings). As shown in FIG. 6, the ball 411 is accommodated in the circumferential groove section 40. In this manner, rattling of the workpiece holding member 3 in the left-right direction (axial direction) is regulated with respect to the chuck main body 2 due to the ball 411 being accommodated in the circumferential groove section 40.

Circumferential Direction Regulating Mechanism 5, Bolt 6

A circumferential direction regulating mechanism 5 is provided with three axially recessed sections 50 and an index plunger 51. The index plunger 51 is included in the concept of the "plunger" of the present invention.

As shown in FIGS. 2, 4, and 5(b), three axially recessed sections 50 are each recessed in the right face 201b of the second member 201. The three axially recessed sections 50 are disposed separated from each other by a center angle of 120°. The axially recessed section 50 has a straight hole shape that extends in the left-right direction. The index plunger 51 is disposed in one second through-hole 311e out of the three second through holes 311e of the bottom wall section 311. A bolt 6 is screwed into each of remaining two second through-holes 311e out of the three second through holes 311e.

Figure 5:
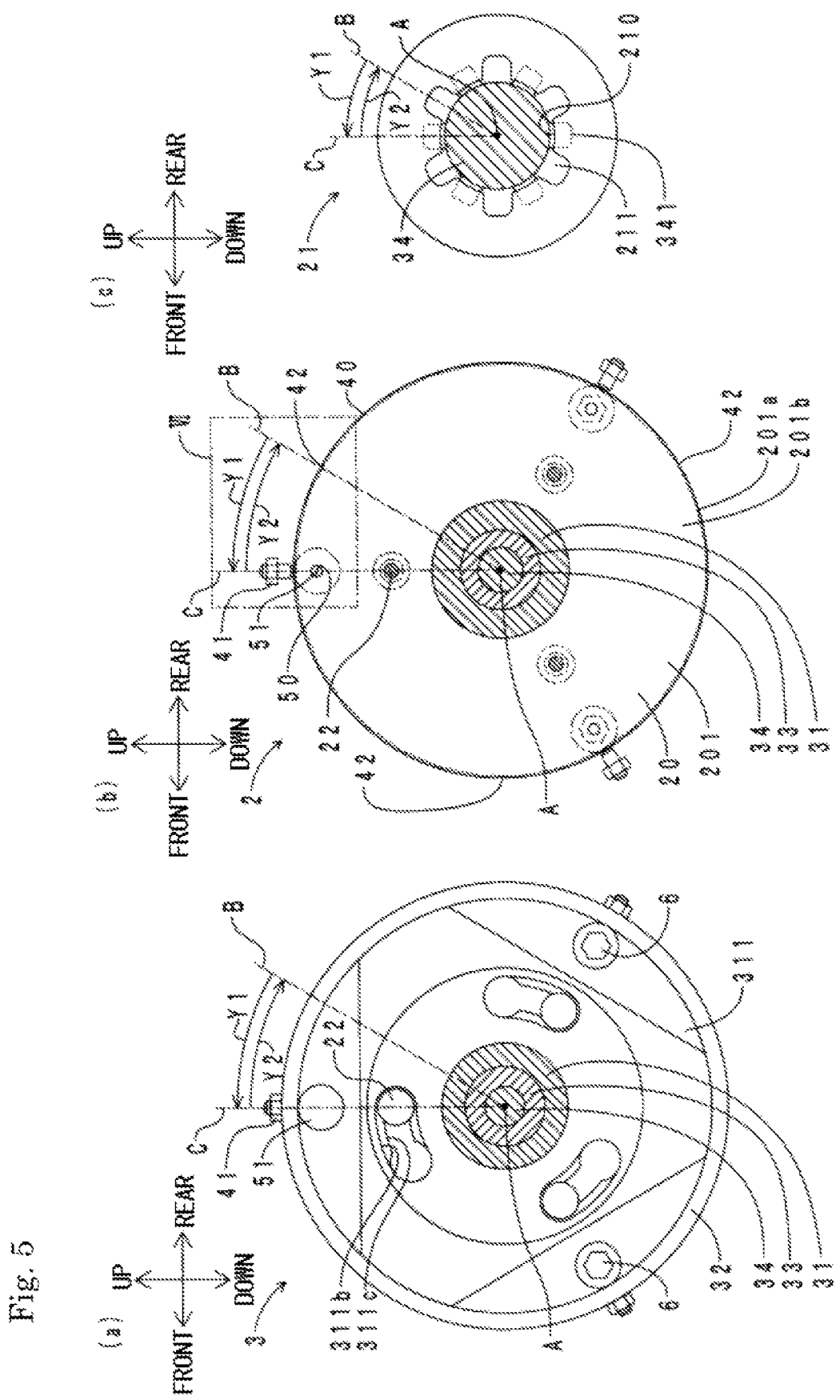
FIG. 5(a) is a sectional view along a Va-Va direction of FIG. 3.
FIG. 5(b) is a sectional view along a Vb-Vb direction of FIG. 3.
FIG. 5(c) is a sectional view along a Vc-Vc direction of FIG. 3.
Figure 6:
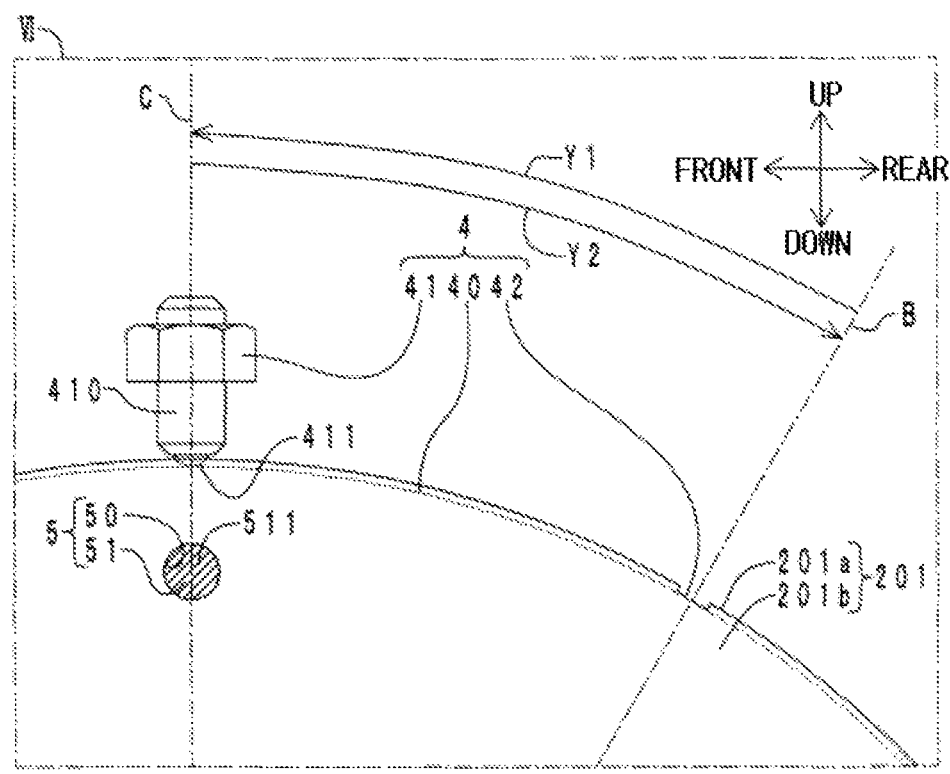
FIG. 6 is an enlarged view of frame VI of FIG. 5(b).

As shown in FIG. 5 (a), the index plunger 51 and two bolts 6 are disposed separated from each other by a center angle of 120°. As shown in FIG. 4, the index plunger 51 is provided with a base section 510 and a protruding section 511. The base section 510 has a cylindrical shape that extends in the left-right direction. The base section 510 is connected to a right end opening of the second through hole 311e of the bottom wall section 311. The protruding section 511 is inserted into the radially inner side of the base section 510 and the radial inner side of the second through hole 311e. The protruding section 511 is biased to the left side (direction that protrudes from the base section 510) by a spring (omitted from the drawings). The left end (tip end) of the protruding section 511 is accommodated in the axially recessed section 50. Rattling of the protruding section 511 in the circumferential direction is regulated by the axially recessed section 50. In this manner, rattling of the workpiece holding member 3 in the circumferential direction is regulated with respect to the chuck main body 2 due to the protruding section 511 being accommodated in the axially recessed section 50. Additionally, a circumferential direction position of the workpiece holding member 3 is determined with respect to the chuck main body 2.

Attachment Method of Workpiece Holding Member With Respect to Chuck Main Body

Next, an attachment method of the workpiece holding member with respect to chuck main body will be described. For example, the attachment method is executed during setup changing and the like. That is, the attachment method is executed when the workpiece holding member 3 is exchanged according to the type of workpiece W. The attachment method has an insertion step and a rotation step. The attachment method is manually performed by an operator.

FIG. 7(a) indicates a sectional view along the Va-Va direction of FIG. 3 in a case where an angle of a workpiece holding member with respect to a chuck main body is a release angle. FIG. 7(b) illustrates a sectional view along a Vb-Vb direction of FIG. 3 in the same case. FIG. 7(c) illustrates a sectional view along a Vc-Vc direction of FIG. 3 in the same case. FIG. 8 illustrates an enlarged view of frame VIII of FIG. 11b). Note that, FIG. 8 corresponds to FIG. 6.

Insertion Step

Figure 7:
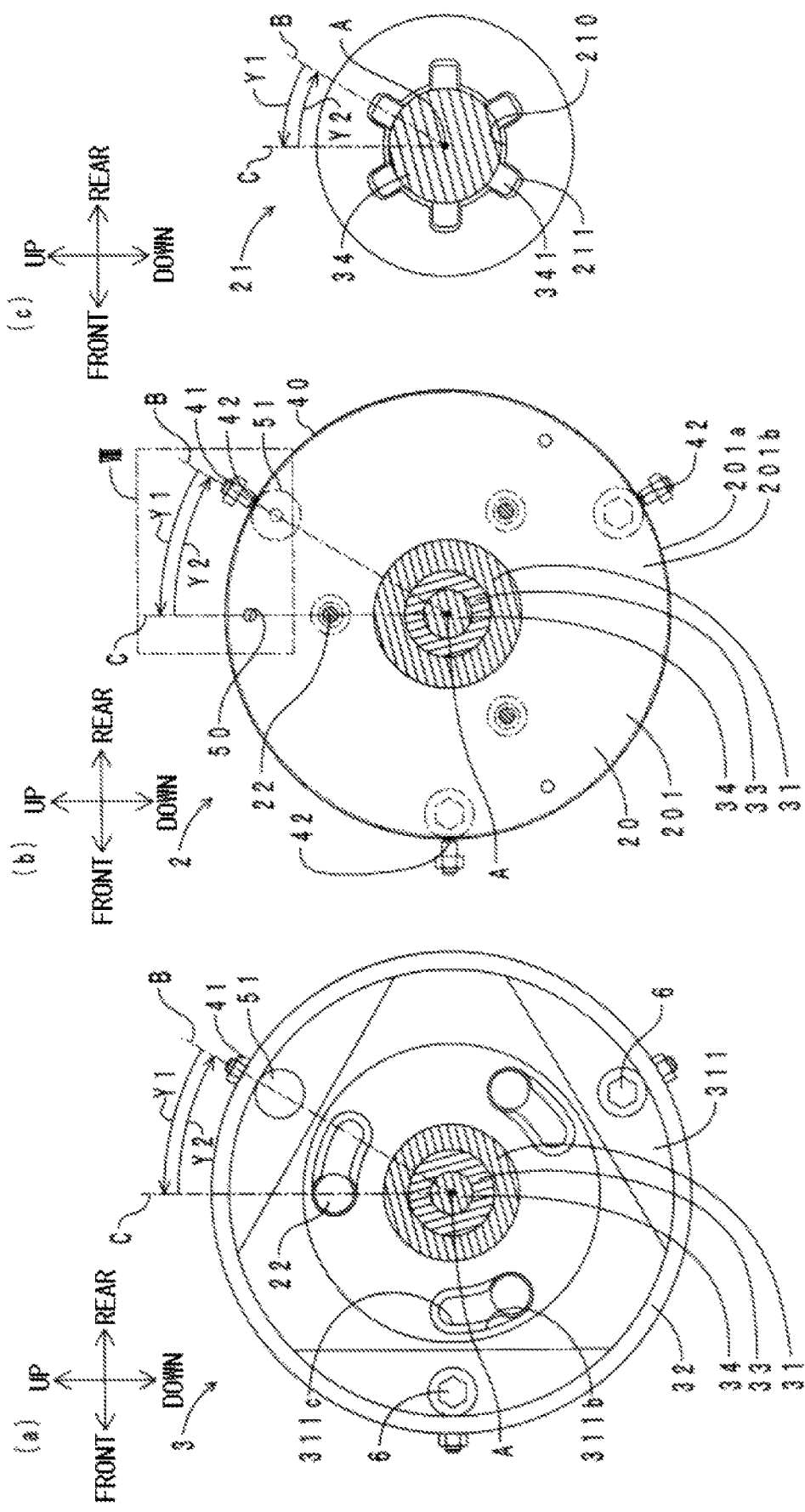
FIG. 7(a) is a sectional view along the Va-Va direction of FIG. 3 in a case where an angle of a workpiece holding member with respect to a chuck main body is a release angle.
FIG. 7(b) is a sectional view along the Vb-Vb direction of FIG. 3 in the same case.
FIG. 7(c) is a sectional view along the Vc-Vc direction of FIG. 3 in the same case.
Figure 8:
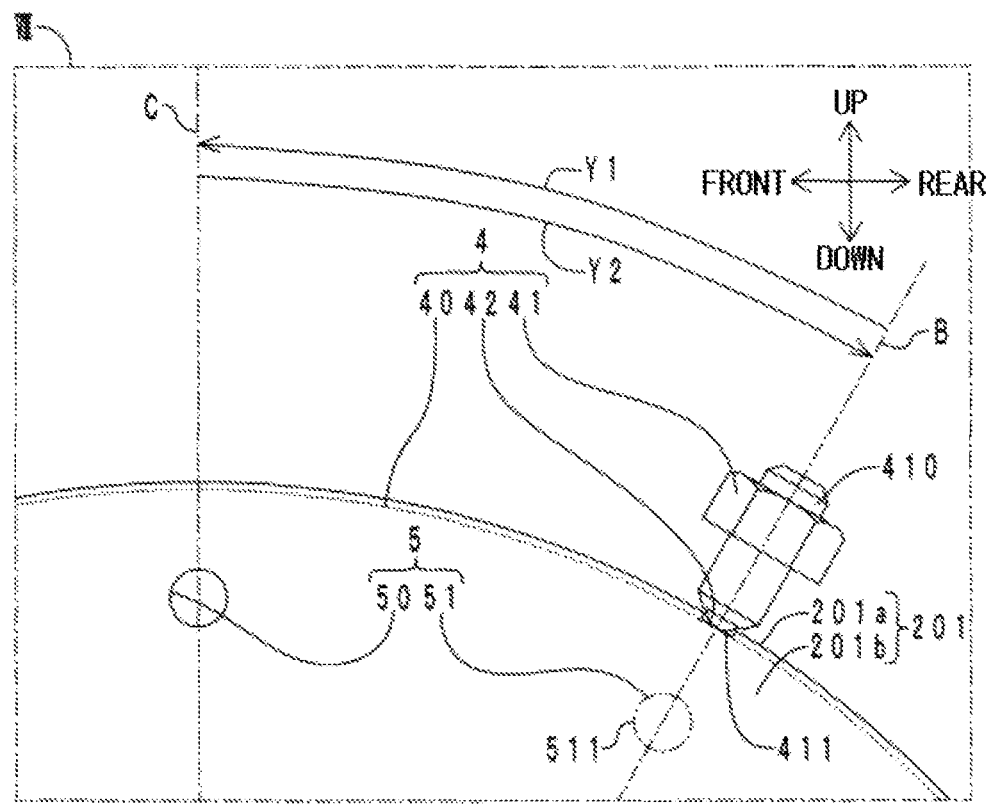
FIG. 8 is an enlarged view of frame VIII of FIG. 7(b).

In the present step, first, as shown in FIG. 2, the angle of a workpiece holding member 3 with respect to the chuck main body 2 is set as a release angle B (refer to FIG. 7 (a) to 7 (c)). Specifically, the workpiece holding member 3 is disposed on the same axis (on axis A) as the chuck main body 2 in a state in which the workpiece holding member 3 is separated on the right side with respect to the chuck main body 2. In addition, the workpiece holding member 3 is set to an angle (release angle B) that is rotated in the release direction Y2 by a center angle of 30° with respect to the lock angle C.

At the release angle B, the bolt 22 and the head section insertion section 311ca of the body section long hole 311c face each other in the left-right direction. In addition, the axial groove section 42 and the ball plunger 41 face each other in the left-right direction. In addition, the tooth section 211 and the tooth section 341 are disposed to be deviated in the circumferential direction (so as to face each other in the left-right direction).

In the present step, next, the second member 201 is relatively inserted into the recessed section (recessed section is a bottomed tube that opens the left side) that is formed by the bottom wall section 311 and the circumferential wall member 32 by the workpiece holding member 3 being caused to approach the chuck main body 2 from the right side with the release angle B being held without change. Note that, during insertion, as shown by a dashed line in FIG. 4, the protruding section 511 of the index plunger 51 is held in a state of protruding from the base section 510 to the right side.

Due to the insertion, the left face 311a of the bottom wall section 311 abuts with the right face 201b of the second member 201. Additionally, the inner circumferential surface 320 of the circumferential wall member 32 abuts with, the outer circumferential surface 201a of the second member 201.

As shown in FIGS. 2 and 7(c), the shaft 34 is accommodated in the recessed section 210. At this time, an arbitrary tooth section 341 passes through a gap between an arbitrary pair of tooth sections 211 that are adjacent in the circumferential direction from the right side to the left side.

In addition, as shown in FIGS. 2 and 7(a), the head section 220 of the bolt 22 passes through the head section insertion section 311ca of the body section long hole 311c and is accommodated in the head section long hole 311b. Additionally, the body section 221 of the bolt 22 is accommodated in the body section long hole 311c. In addition, as shown in FIGS. 2, 7(b), and 8, the ball 411 of the ball plunger 41 passes through the axial groove section 42 and is accommodated in the circumferential groove section 40.

In this manner, as shown in FIG. 3, the left face 311a of the bottom wall section 311 abuts with the right face 201b of the second member 201, and thereby the left-right direction position (axial direction position) of the workpiece holding member 3 is determined with respect to the chuck main body 2.

In addition, as shown in FIG. 3, the tapered surface 201c of the second member 201 and the tapered surface of the boss section 311f of the bottom wall section 311 are in slidable contact, and thereby rattling of the workpiece holding member 3 in the radial direction is regulated with respect to the chuck main body 2.

In addition, as shown in FIG. 4, the ball 411 is in elastic contact with a V shape right side face (tapered surface pointed from the right side toward the left side) of the circumferential groove section 40. Therefore, the ball 411, that is, the workpiece holding member 3 is biased to the left side (direction that presses the chuck main body 2). Additionally, rattling of the workpiece holding member 3 in the left-right direction is regulated with respect to the chuck main body 2.

Rotation Step

In the present step, the angle of the workpiece holding member 3 with respect to the chuck main body 2 is switched from the release angle B (refer to FIGS. 7(a) to 7(c)) to the lock angle C, (refer to FIGS. 5(a) to 5(c)). Specifically, the workpiece holding member 3 is caused to rotate in the lock direction Y1 by a center angle of 30°.

Due to the rotation, the inner circumferential surface 320 of the circumferential wall member 32 slides with respect to the outer circumferential surface 201a of the second member 201 in a state in which the left face 311a of the bottom wall section 311 abuts with the right face 201b of the second member 201 without any changes.

As shown in FIGS. 2 and 5(a), the head section long hole 311b moves in the lock direction Y1 in a state in which the head section 220 is accommodated without any changes. Therefore, the head section 220 relatively moves the inside of the head section long hole 311b from the lock direction end portion to the release direction end portion. The head section 220 and a step section between the body section long hole 311c and the head section long hole 311b engage in the left-right direction. An operator is able to confirm the head section 220 of the bolt 22 through the bolt confirmation hole 300. In the same manner, the body section long hole 311c moves in the lock direction Y1 in a state in which the body section 221 is accommodated without any changes. Therefore, the body section 221 relatively moves the inside of the body section long hole 311c from the head section insertion section 311ca to the release direction end portion. In addition, as shown in FIGS. 5(b) and 6, the ball 411 moves the inside of the circumferential groove section 40 in lock direction Y1. In addition, as shown in FIGS. 2 and 5(c), the tooth section 341 and the tooth section 211 face each other in the left-right direction.

In addition, as shown, in FIGS. 2, 5(b), and 6, the protruding section 511 of the index plunger 51 slides the right face 201b of the second member 201 in the lock direction Y1. In this arrangement, the axially recessed section 50 is disposed at the lock angle C in the right face 201b of the second member 201. Therefore, at the lock angle C, the protruding section 511 fits the axially recessed section 50 due to own elastic restoring force. In this manner, the circumferential direction position of the workpiece holding member 3 is determined with respect to the chuck main body 2 due to the protruding section 511 being accommodated in the axially recessed section 50.

By doing so, the attachment method of the workplace holding member 3 with respect to the chuck main body 2 is executed. Note that, a detachment method of the workpiece holding member 3 with respect to the chuck main body 2 is executed by a reverse procedure from the attachment method. The detachment method is manually performed by an operator in the same manner, as the attachment method. During setup changing, first, the used up workpiece holding member 3 is detached from the chuck main body 2 using the detachment method. Next, the unused workpiece holding member 3 is attached to the chuck main body 2 using the attachment method.

Actions and Effects

Next, actions and effects of the chuck device of the present embodiment will be described. According to the chuck device 1 of the present embodiment, it is possible to manually attach and detach the workpiece holding member 3 with respect to the chuck main body 2. Therefore, it is not necessary to dispose the cylinder device and the power source of the cylinder device in the chuck device 1. Accordingly, the structure of the chuck device 1 is simplified.

In addition, according to the chuck device 1 of the present embodiment, it is possible to simply exchange the workpiece holding member 3 with respect to the chuck main body 2. That is, in the attachment method, the operator is able to simply attach the workpiece holding member 3 to the chuck main body 2 by first, pressing the workpiece holding member 3 on the chuck main body 2 (insertion step) and next, twisting the workpiece holding member 3 (rotation step). That is, in the detachment method, the operator is able to simply detach the workpiece holding member 3 from the chuck main body 2 by first, twisting the workpiece holding member 3 and next, pulling away the workpiece holding member 3 from the chuck main body 2.

In addition, rattling of the workpiece holding member 3 in the left-right direction is regulated with respect to the chuck main body 2 due to the ball 411 of the axial direction regulating mechanism 4 being accommodated in the circumferential groove section 40. Additionally, rattling of the workpiece holding member 3 in the peripheral direction is regulated with respect to the chuck main body 2 due to the protruding section 511 of the circumferential direction regulating mechanism 5 being accommodated in the axially recessed section 50.

In addition, the bolt 22 illustrated in FIG. 2 is screwed on the second member 201 in a fastened state. Therefore, in the attachment method and the detachment method, it is not necessary to tighten or loosen the holt 22. Accordingly, in the attachment method and the detachment method, it is not necessary to use a tool.

In addition, in the attachment method, it is possible to position the workpiece holding member 3 with respect to the chuck main body 2 in a stepped manner. Specifically, in the insertion step, it is possible to determine the left-right direction position of the workpiece holding member 3 with respect to the chuck main body 2. Additionally, in the rotation step, it is possible to determine the circumferential direction position of the workpiece holding member 3 with respect to the chuck main body 2. Therefore, work is simple in comparison to a case of simultaneously performing both positioning.

In addition, as shown in FIGS. 6 and 8, in the rotation step, the ball plunger 41 is guided into the circumferential groove section 40. That is, rattling of the ball plunger 41, that is, the workpiece holding member 3 in the left-right direction is regulated. Therefore, it is possible to simply determine the circumferential direction position of the workpiece holding member 3 without considering deviation of the left-right direction position of the workpiece holding member 3. In addition, according to the chuck device 1 of the present embodiment, the workpiece holding member 3 is used as the exchange member of the present invention. Therefore, if is possible to simply and quickly perform setup changing work.

In addition, as shown in FIGS. 2 and 8, in the insertion step, the ball plunger 41 is guided into the axial groove section 42. Therefore, it is possible to simply insert the ball plunger 41 in the circumferential groove section 40.

In addition, according to the chuck device 1 of the present embodiment, a commercially available ball plunger 41 is used as the radially protruding section of the present invention. In addition, a commercially available index plunger 51 is used as the axially protruding section of the present invention. Therefore, it is possible to reduce the installation cost of the radially protruding section and the axially protruding section.

In addition, in the insertion step, the left face 311a of the bottom wall section 311 abuts with the right face 201b of the second member 201. Additionally, the inner circumferential surface 320 of the circumferential wall member 32 abuts with the outer circumferential surface 201a of the second member 201. Therefore, in the rotation step, it is possible to regulate rattling of the workpiece holding member 3 with respect to the chuck main body 2 in the left-right direction in the radial direction.

In addition, as shown in FIG. 3, the workpiece holding member 3 is provided with the strip 30 and the collet member 31. Therefore, it is possible to appropriately position the workpiece W in the left-right direction and grip the workpiece W according to the type of workpiece W by exchanging the workpiece holding member 3.

In addition, as shown in FIG. 3, in a clamped state in which the workpiece W is gripped and in an unclamped state in which the workpiece W is not gripped, the ball plunger 41 is accommodated in the circumferential groove section 40. Additionally, the index plunger 51 is accommodated in the axially recessed section 50. Therefore, during switching from the unclamped state to the clamped state (during pulling of the draw bar 21 to the left side), the workpiece holding member 3 with respect to the chuck main body 2 tends not to rattle in the axial direction and the circumferential direction.

In addition, as shown in FIGS. 4 and 6, in the rotation step, the protruding section 511 of the index plunger 51 fits the axially recessed section 50 of the lock angle C. Therefore, completion of the rotation step is easy for the operator to recognize.

In addition, as shown in FIG. 3, while gripping the workpiece W, the workpiece holding member 3 presses the chuck main body 2 due to tensile force of the draw bar 21. That is, while gripping the workpiece W, said pressing force and the pressing force by the ball plunger 41 illustrated in FIG. 4 act on the workpiece holding member 3. Therefore, rattling of the workpiece holding member 3 is further regulated with respect to the chuck main body 2.

In addition, as shown in FIG. 5(a), the two bolts 6 are disposed at positions that are separated from the index plunger 51 by a center angle of 120° in a clockwise direction and a counterclockwise direction. Therefore, rotation balance of the chuck device 1 is favorable.

Others

Embodiments of a chuck device of the present invention were described above. However, the embodiments are not particularly limited to the aspect. It is also possible for a person skilled in the art to implement various modified aspects and improved aspects.

A size relationship of a groove depth of the axial groove section 42 and the groove depth of the circumferential groove section 40 illustrated in FIGS. 6 and 8 (in the embodiment, the groove depths of the two groove sections are the same) is not particularly limited. In a state in which the ball plunger 41 is fully extended, attachment and detachment work may be possible. For example, the groove depth of the axial groove section 42 may be shallower than the groove depth of the circumferential groove section 40. Consequently, in the insertion step, when the ball 411 is inserted into the circumferential groove section 40 from the axial groove section 42, the ball 411 protrudes from the base section 410 according to a groove depth difference. Therefore, it is easy for the operator to recognize the insertion.

An extension distance of the circumferential groove section 40 illustrated in FIGS. 6 and 8 (in the embodiment, entire circumference) is not particularly limited. At least, the circumferential groove section 40 may extend between the release angle B and the lock angle C. An engagement mechanism of the draw bar 21 and the shaft 34 illustrated in FIG. 2 (in the embodiment, tooth section 211 and tooth section 341) is not particularly limited. It may not be possible to transfer tensile force from the draw bar 21 to the shaft 34.

A disposal number (in the embodiment, three disposed separated from each other by a center angle of 120°) of the axial groove section 42, the ball plunger 41, the axially recessed section 50, the bolt 22, and the hole set illustrated in FIG. 2 (hole set consisting of the body section long hole 311c, the head section long hole 311b, and the bolt confirmation hole 300 that are linked to each other) is not particularly limited. For example, two components may be separated from each other by a center angle of 180°, four components may be separated from each other by a center angle of 90°, and six components or the like may be separated from each other by a center angle of 60°. In addition, the disposal number of the index plunger 51 (one in the present embodiment) is not particularly limited. In addition, the angle between the release angle B and the lock angle C (center angle of 30° in the embodiment) is not particularly limited. For example, the angle may be 15°, 60°, 90°, 180°, or the like. In addition, the axial groove section 42 may not be disposed.

As shown in FIG. 2, in the embodiment, the circumferential groove section 40 is disposed on the outer circumferential surface 201a of the second member 201 and the ball plunger 41 is disposed in the circumferential wall member 32. However, the disposal relationship between the circumferential groove section 40 and the ball plunger 41 is not particularly limited. For example, the circumferential groove section 40 may be disposed on the inner circumferential surface 320 of the circumferential wall member 32 and the ball plunger 41 may be disposed on the outer circumferential surface 201a of the second member 201.

As shown in FIG. 2, in the embodiment, the axially recessed section 50 is disposed on the right face 201b of the second member 201 and the index plunger 51 is disposed on the bottom wall section 311. However, the disposal relationship between the axially recessed section 50 and the index plunger 51 is not particularly limited. For example, the axially recessed section 50 may be disposed on the left face 311a of the bottom wall section 311 and the index plunger 51 may be disposed on the right face 201b of the second member 201.

An extension direction of the axis A of the main spindle (left-right direction in the present embodiment) is not particularly limited. The direction may be a front-rear direction, an up-down direction, or the like. The type of machine tool (lathe in the present embodiment) that is provided with the chuck device 1 is not particularly limited. For example, the machine tool may be a horizontal lathe, a face lathe, a vertical lathe, a single-axis lathe, a biaxial lathe, a milling machine, a drilling machine, a milling cell, a turning center, a machining center, or the like.

REFERENCE SIGNS LIST

1: chuck device, 2; chuck main body, 20: base, 20a: through hole, 200: first member, 201: second member, 201a: outer circumferential surface, 201b: right face (axial end face), 201c: tapered surface, 21: draw bar, 210: recessed section, 211: tooth section, 22: bolt, 220: head part, 221: body part, 3: workpiece holding member (exchange member), 30: strip, 30a: flange section, 300: bolt confirmation hole, 31: collet member, 310: collet section, 310a: tapered surface, 311: bottom wall section, 311a: left face (bottom face), 311b: head section long hole, 311c: body section long hole, 311ca: head section insertion section, 311d: first through hole, 311e: second through hole, 311f: boss section, 32: circumferential wall member, 320: inner circumferential surface, 321: plunger fixing hole, 33: guide member, 34: shaft, 340: flange section, 341: tooth section, 342: tapered surface, 4: axial direction regulating mechanism, 40: circumferential groove section, 41: ball plunger (plunger), 410: base section, 411: ball (protruding section), 42: axial groove section, 5: circumferential direction regulating mechanism, 50: axially recessed section, 51: index plunger (plunger), 510: base section, 511: protruding section, 6: bolt, A: shaft, B: Release angle, C: lock angle, S: Slit, W: workpiece, Y1: lock direction, Y2: release direction

The invention claimed is:
1. A chuck device comprising:
a chuck main body;

an exchange structure that is disposed to be exchangeable in the chuck main body;

an axial direction regulating mechanism that has a circumferential groove section which is recessed into one of the chuck main body and the exchange structure and extends in the circumferential direction, and a radially protruding section which is disposed in the other of the chuck main body and the exchange structure and is to protrude in the radial direction, and the axial direction regulating mechanism regulates rattling of the exchange structure in the axial direction with respect to the chuck main body by causing the exchange structure to abut with the chuck main body from the axial direction and inserting the radially protruding section into the circumferential groove section; and a circumferential direction regulating mechanism that has an axially recessed section which is disposed in one of the chuck main body and the exchange structure, and is recessed in the axial direction, and an axially protruding section, which is disposed in the other of the chuck main body and the exchange structure and is to protrude in the axial direction, the axially protruding section being movable in the axial direction relative to the chuck main body and the exchange structure when the axially protruding section is disposed in the axially recessed section, and the circumferential direction regulating mechanism regulates rattling of the exchange structure in the circumferential direction with respect to the chuck main body by causing the exchange structure to rotate by a predetermined angle in the circumferential direction and causing the radially protruding section to slide in the circumferential groove section and inserting the axially protruding section into the axially recessed section in a state in which rattling of the exchange structure in the axial direction with respect to the chuck main body is regulated by the axial direction regulating mechanism wherein the chuck main body has an axial end face and an outer circumferential surface, the exchange structure has a bottom face that faces the axial end face and an inner circumferential surface that faces the outer circumferential surface, and the exchange structure is a bottomed tube that opens toward the chuck main body, the axial direction regulating mechanism has the circumferential groove section that is recessed in the outer circumferential surface of the chuck main body and the radially protruding section that is to protrude from the inner circumferential surface of the exchange structure to the radially inner side, and the circumferential direction regulating mechanism has the axially recessed section that is recessed in the axial end face of the chuck main body and the axially protruding section that is to protrude from the bottom face of the exchange structure in the axial direction.

2. The chuck device according to claim 1, wherein viewed from the axial direction, the angle of the exchange structure prior to being rotated by the predetermined angle in the circumferential direction with respect to the chuck main body is a release angle and the angle of the exchange structure after being rotated by the predetermined angle in the circumferential direction with respect to the chuck main body is a lock angle, the axial direction regulating mechanism has an axial groove section that is recessed in the outer circumferential surface of the chuck main body and links the axial end face and the circumferential groove section of the chuck main body in the axial direction, and in the release angle, the radially protruding section is inserted into the circumferential groove section by causing the radially protruding section to slide in the axial groove section.

3. The chuck device according to claim 1, wherein at least one out of the radially protruding section and the axially protruding section is a plunger that has a base section and a protruding portion that is to protrude from the base section.

4. The chuck device according to claim 2, wherein at least one out of the radially protruding section and the axially protruding section is a plunger that has a base section and a protruding portion that is to protrude from the base section.

5. A chuck device comprising:

a chuck main body;

an exchange structure that is disposed to be exchangeable in the chuck main body;

an axial direction regulating mechanism that has a circumferential groove section which is recessed into one of the chuck main body and the exchange structure and extends in the circumferential direction, and a radially protruding section which is disposed in the other of the chuck main body and the exchange structure and is to protrude in the radial direction, and the axial direction regulating mechanism regulates rattling of the exchange structure in the axial direction with respect to the chuck main body by causing the exchange structure to abut with the chuck main body from the axial direction and inserting the radially protruding section into the circumferential groove section; and a circumferential direction regulating mechanism that has an axially recessed section which is disposed in one of the chuck main body and the exchange structure, and is recessed in the axial direction, and an axially protruding section, which is disposed in the other of the chuck main body and the exchange structure and is to protrude in the axial direction, and the circumferential direction regulating mechanism regulates rattling of the exchange structure in the circumferential direction with respect to the chuck main body by causing the exchange structure to rotate by a predetermined angle in the circumferential direction and causing the radially protruding section to slide in the circumferential groove section and inserting the axially protruding section into the axially recessed section in a state in which rattling of the exchange structure in the axial direction with respect to the chuck main body is regulated by the axial direction regulating mechanism, wherein the chuck main body has an axial end face and an outer circumferential surface, the exchange structure has a bottom face that faces the axial end face and an inner circumferential surface that faces the outer circumferential surface, and the exchange structure is a bottomed tube that opens toward the chuck main body, the axial direction regulating mechanism has the circumferential groove section that is recessed in the outer circumferential surface of the chuck main body and the radially protruding section that is to protrude from the inner circumferential surface of the exchange structure to the radially inner side, and the circumferential direction regulating mechanism has the axially recessed section that is recessed in the axial end face of the chuck main body and the axially protruding section that is to protrude from the bottom face of the exchange structure in the axial direction.

6. The chuck device according to claim 5,
wherein at least one out of the radially protruding section and the axially protruding section is a plunger that has a base section and a protruding portion that is to protrude from the base section.

7. The chuck device according to claim 5,
wherein viewed from the axial direction, the angle of the exchange structure prior to being rotated by the predetermined angle in the circumferential direction with respect to the chuck main body is a release angle and the angle of the exchange structure after being rotated by the predetermined angle in the circumferential direction with respect to the chuck main body is a lock angle,
the axial direction regulating mechanism has an axial groove section that is recessed in the outer circumferential surface of the chuck main body and links the axial end face and the circumferential groove section of the chuck main body in the axial direction, and
in the release angle, the radially protruding section is inserted into the circumferential groove section by causing the radially protruding section to slide in the axial groove section.

8. The chuck device according to claim 7,
wherein at least one out of the radially protruding section and the axially protruding section is a plunger that has a base section and a protruding portion that is to protrude from the base section.

* * * * *